(12) United States Patent
Caprario

(10) Patent No.: US 10,815,903 B2
(45) Date of Patent: Oct. 27, 2020

(54) THRUST BEARING SYSTEM WITH INVERTED NON-CONTACTING DYNAMIC SEALS FOR GAS TURBINE ENGINE

(71) Applicant: United Technologies Corporation, Farmington, CT (US)

(72) Inventor: Joseph T. Caprario, Cromwell, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 389 days.

(21) Appl. No.: 16/151,596

(22) Filed: Oct. 4, 2018

(65) Prior Publication Data

US 2019/0170067 A1 Jun. 6, 2019

Related U.S. Application Data

(62) Division of application No. 13/234,338, filed on Sep. 16, 2011, now Pat. No. 10,119,476.

(51) Int. Cl.
| | | |
|---|---|---|
| *F02C 9/18* | (2006.01) | |
| *F01D 3/00* | (2006.01) | |

(Continued)

(52) U.S. Cl.
CPC ............... *F02C 9/18* (2013.01); *F01D 3/00* (2013.01); *F01D 5/081* (2013.01); *F01D 11/025* (2013.01);

(Continued)

(58) Field of Classification Search
CPC ...... F01D 9/023; F01D 11/003; F01D 11/025; F01D 5/081; F01D 3/00; F05D 2240/55;

(Continued)

(56) References Cited

U.S. PATENT DOCUMENTS 1,831,224 A    11/1931    Baumann
2,530,477 A *   11/1950    Ostmar ..................... F01D 3/04
                                                                                                      415/104

(Continued)

FOREIGN PATENT DOCUMENTS

| EP | 622369 | 11/1994 |
|---|---|---|
| EP | 1420145 | 5/2004 |

(Continued)

OTHER PUBLICATIONS

Zuk, J. (1976). Dynamic sealing principles. NASA Technical Memorandum NASA TM X-71851. pp. 5-6 and 11-16.

(Continued)

*Primary Examiner* — David E Sosnowski
*Assistant Examiner* — Wayne A Lambert
(74) *Attorney, Agent, or Firm* — Carlson, Gaskey & Olds, P.C.

(57) ABSTRACT

A gas turbine engine includes a first non-contacting dynamic rotor seal interfaced with a spool, the first non-contacting dynamic seal operates to seal adjacent to an outer diameter and a second non-contacting dynamic rotor seal with respect to the spool, the second non-contacting dynamic seal operates to seal adjacent to an inner diameter. A method of controlling a net thrust load on a thrust bearing of a gas turbine engine spool is also disclosed.

20 Claims, 5 Drawing Sheets

(51) Int. Cl.
*F01D 5/08* (2006.01)
*F01D 11/02* (2006.01)
*F02C 7/28* (2006.01)
*F16J 15/44* (2006.01)
*F02C 7/12* (2006.01)

(52) U.S. Cl.
CPC .............. *F02C 7/12* (2013.01); *F02C 7/28* (2013.01); *F16J 15/441* (2013.01); *F05D 2240/55* (2013.01); *F05D 2260/15* (2013.01); *Y10T 29/49229* (2015.01)

(58) Field of Classification Search
CPC .......... F05D 2260/15; F02C 9/18; F02C 7/28; F02C 7/12; F16J 15/441; Y10T 29/49229
USPC ........ 415/109, 111, 171.1, 173.7, 174.5, 230
See application file for complete search history.

(56) References Cited

U.S. PATENT DOCUMENTS

| | | |
|---|---|---|
| 3,382,670 A | 5/1968 | Venable |
| 3,433,020 A | 3/1969 | Earle |
| 3,452,542 A * | 7/1969 | Saferstein .............. F01D 9/065 60/752 |
| 3,505,813 A | 4/1970 | McCarthy |
| 3,549,270 A | 12/1970 | Petrie |
| 3,917,150 A | 11/1975 | Ferguson et al. |
| 4,163,366 A | 8/1979 | Kent |
| 4,164,833 A | 8/1979 | Todd |
| 4,348,157 A | 9/1982 | Campbell |
| 4,411,594 A | 10/1983 | Pellow et al. |
| 4,425,079 A | 1/1984 | Speak |
| 4,466,228 A * | 8/1984 | Gess ....................... B65B 9/02 156/515 |
| 4,600,202 A | 7/1986 | Schaeffler et al. |
| 4,653,267 A | 3/1987 | Brodell et al. |
| 4,697,981 A | 10/1987 | Brown et al. |
| 4,730,977 A | 3/1988 | Haaser |
| 4,907,943 A | 3/1990 | Kelch |
| 5,026,252 A | 6/1991 | Hoffelner |
| 5,181,728 A | 1/1993 | Stec |
| 5,183,197 A | 2/1993 | Howe |
| 5,415,478 A | 5/1995 | Matthews et al. |
| 5,755,445 A | 5/1998 | Arora |
| 5,799,952 A | 9/1998 | Morrison et al. |
| 5,944,320 A | 8/1999 | Werner et al. |
| 5,997,004 A | 12/1999 | Braun et al. |
| 6,079,714 A | 6/2000 | Kemsley |
| 6,079,945 A | 6/2000 | Wolfe et al. |
| 6,254,344 B1 | 7/2001 | Wright et al. |
| 6,394,387 B1 | 5/2002 | Mitrovic |
| 6,428,009 B2 | 8/2002 | Justak |
| 6,558,041 B2 | 5/2003 | Laos |
| 6,840,519 B2 | 1/2005 | Dinc et al. |
| 7,025,356 B1 | 4/2006 | Cheung et al. |
| 7,055,303 B2 | 6/2006 | Macfarlane et al. |
| 7,182,345 B2 | 2/2007 | Jutsak |
| 7,410,173 B2 | 8/2008 | Justak |
| 7,578,653 B2 | 8/2009 | Klasing |
| 7,581,889 B2 | 9/2009 | Bruno et al. |
| 7,594,760 B2 | 9/2009 | Goss et al. |
| 7,726,021 B2 | 6/2010 | Barnett |
| 7,828,513 B2 | 11/2010 | Durocher et al. |
| 7,850,173 B2 | 12/2010 | Ivakitch |
| 7,896,352 B2 | 3/2011 | Justak |
| 7,912,587 B2 | 3/2011 | Walters et al. |
| 8,002,285 B2 | 8/2011 | Justak |
| 8,869,538 B2 * | 10/2014 | Nanda ..................... F01D 25/14 60/796 |
| 2005/0194747 A1 | 9/2005 | Morgan et al. |
| 2008/0265513 A1 | 10/2008 | Justak |
| 2011/0000217 A1 | 1/2011 | Grabowski |
| 2011/0067414 A1 | 3/2011 | Matwey |

FOREIGN PATENT DOCUMENTS

| | | |
|---|---|---|
| EP | 1602802 | 12/2005 |
| EP | 1736635 | 12/2006 |
| GB | 2092243 | 8/1982 |
| WO | 2012088499 | 6/2012 |

OTHER PUBLICATIONS

European Search Report for European Application No. 12184052.4 completed Jan. 31, 2017.

* cited by examiner

THRUST BEARING SYSTEM WITH INVERTED NON-CONTACTING DYNAMIC SEALS FOR GAS TURBINE ENGINE

CROSS-REFERENCE TO RELATED APPLICATIONS

This application is a divisional of U.S. patent application Ser. No. 13/234,338, filed on Sep. 16, 2011, herein incorporated by reference in its entirety.

BACKGROUND

The present disclosure relates to a turbine engine, and more particularly to a seal system therefor.

A gas turbine engine includes a secondary or cooling flow system that sheathes a relatively high temperature core flow that passes through a combustor section of the gas turbine engine. The secondary flow system provides thermal control of stationary and rotary engine components to obtain the highest overall cooling effectiveness with the lowest possible penalty on the thermodynamic cycle performance.

Aerodynamic forces applied to or generated by the engine spools are directed towards or away from a thrust bearing which reacts to the thrust of the associated spool. The sum of these forces is the net thrust load. One aspect to configuration of the secondary flow system is the arrangement, orientation and sizing of secondary cavities of the secondary flow system so that the net thrust load is below the allowable load limit for the thrust bearing.

SUMMARY

A gas turbine engine according to an exemplary aspect of the present disclosure includes a non-contacting dynamic seal that seals adjacent to an outer diameter with respect to said spool and a non-contacting dynamic seal that seals adjacent to an inner diameter with respect to said spool.

A method of controlling a net thrust load on a thrust bearing of a gas turbine engine spool according to an exemplary aspect of the present disclosure includes positioning a non-contacting dynamic seal that seals adjacent to an outer diameter with respect to a non-contacting dynamic seal that seals adjacent to an inner diameter to define a secondary flow cavity to affect the net thrust load.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
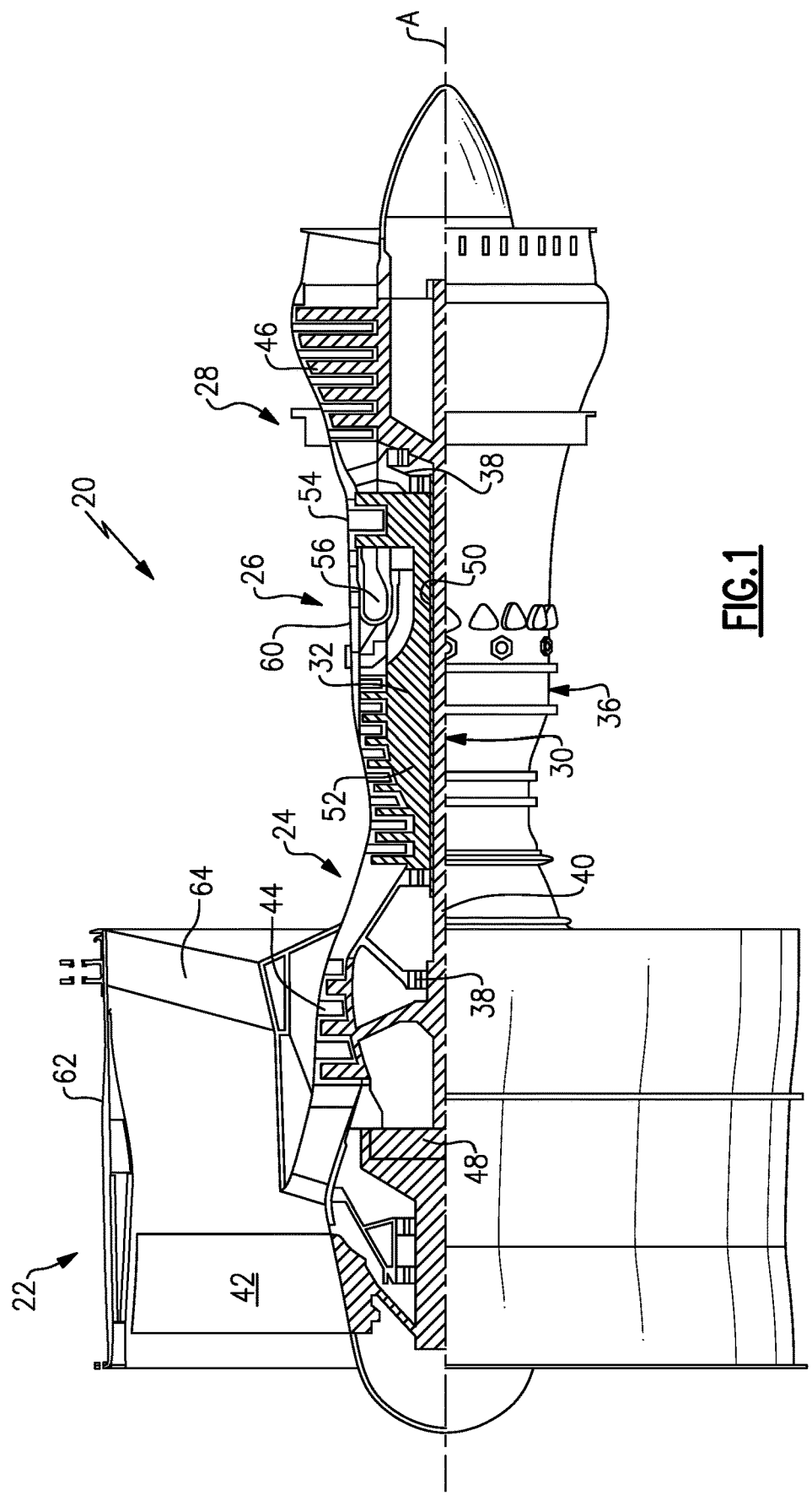
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features, or, may not include the fan section 22 such as that for industrial gas turbine engines. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, such as three-spool architectures.

The engine 20 generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44 and a low pressure turbine 46. The inner shaft 40 may be connected to the fan 42 directly or through a geared architecture 48 (a geared turbofan engine enabling a high flow bypass ratio) to drive the fan 42 at a lower speed than the low spool 30 which in one disclosed non-limiting embodiment includes a gear reduction ratio of greater than 2.5:1. The high spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A that is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low spool 30 and high spool 32 in response to the expansion.

The engine static structure 36 is generally defined by a core case 60 and a fan case 62. The fan case 62 is at least partially supported relative to the core case 60 by a multiple of Fan Exit Guide Vanes (FEGVs) 64. The core case 60 is often referred to as the engine backbone and supports the rotational componentry therein.

Figure 2:
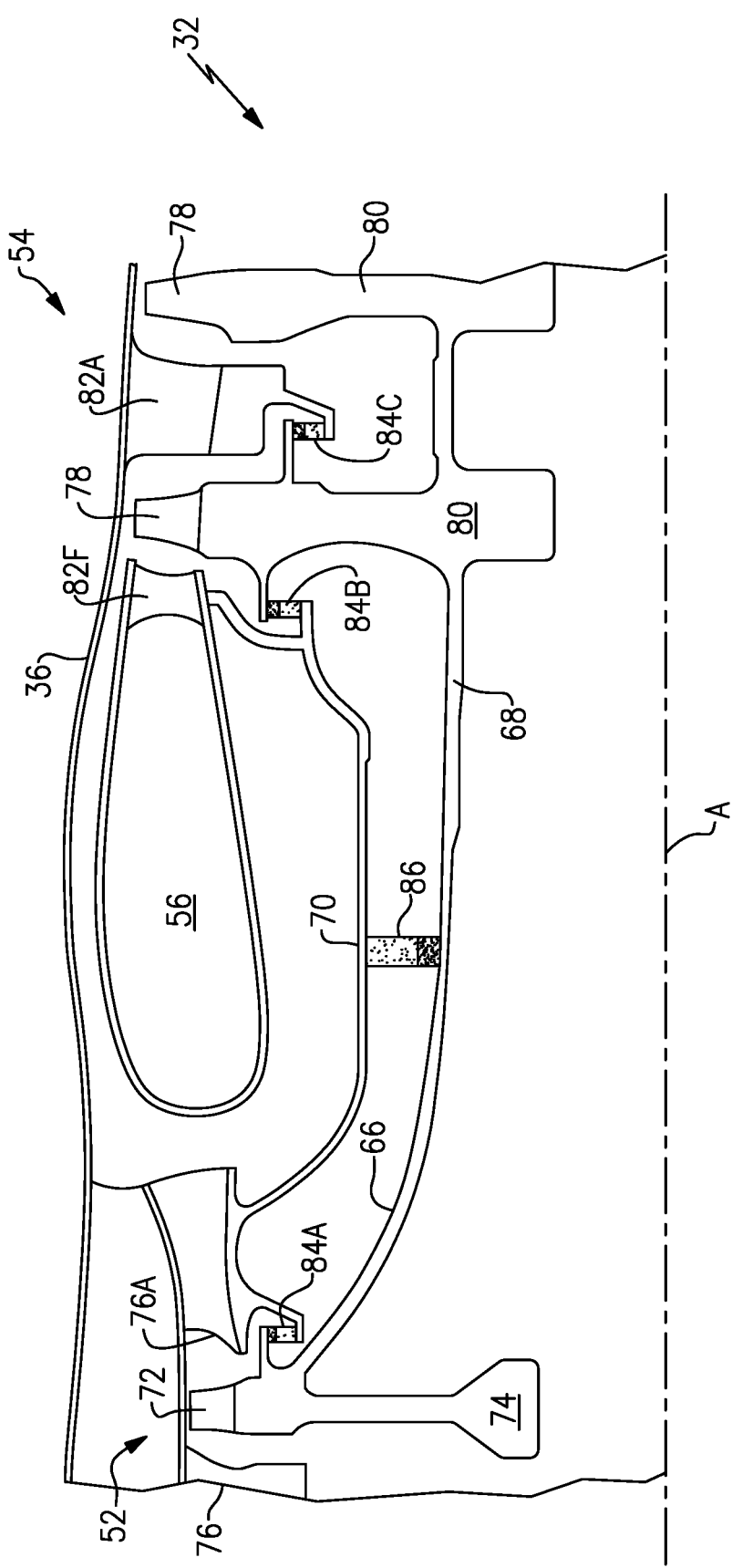
FIG. 2 is a schematic cross-sectional view of a high spool of the gas turbine engine.

With reference to FIG. 2 and continuing reference to FIG. 1, the high pressure compressor 52 and the high pressure turbine 54 of the high spool 32 are defined about the engine central longitudinal axis A. A high pressure compressor rotor hub 66 and a high pressure turbine rotor hub 68 are mounted to the outer shaft 50 to rotate as a unit with respect to the engine static structure 36 that may include an inner diffuser case 70. It should be understood that alternative or additional structure may be utilized to define the high spool 32.

Figure 3:
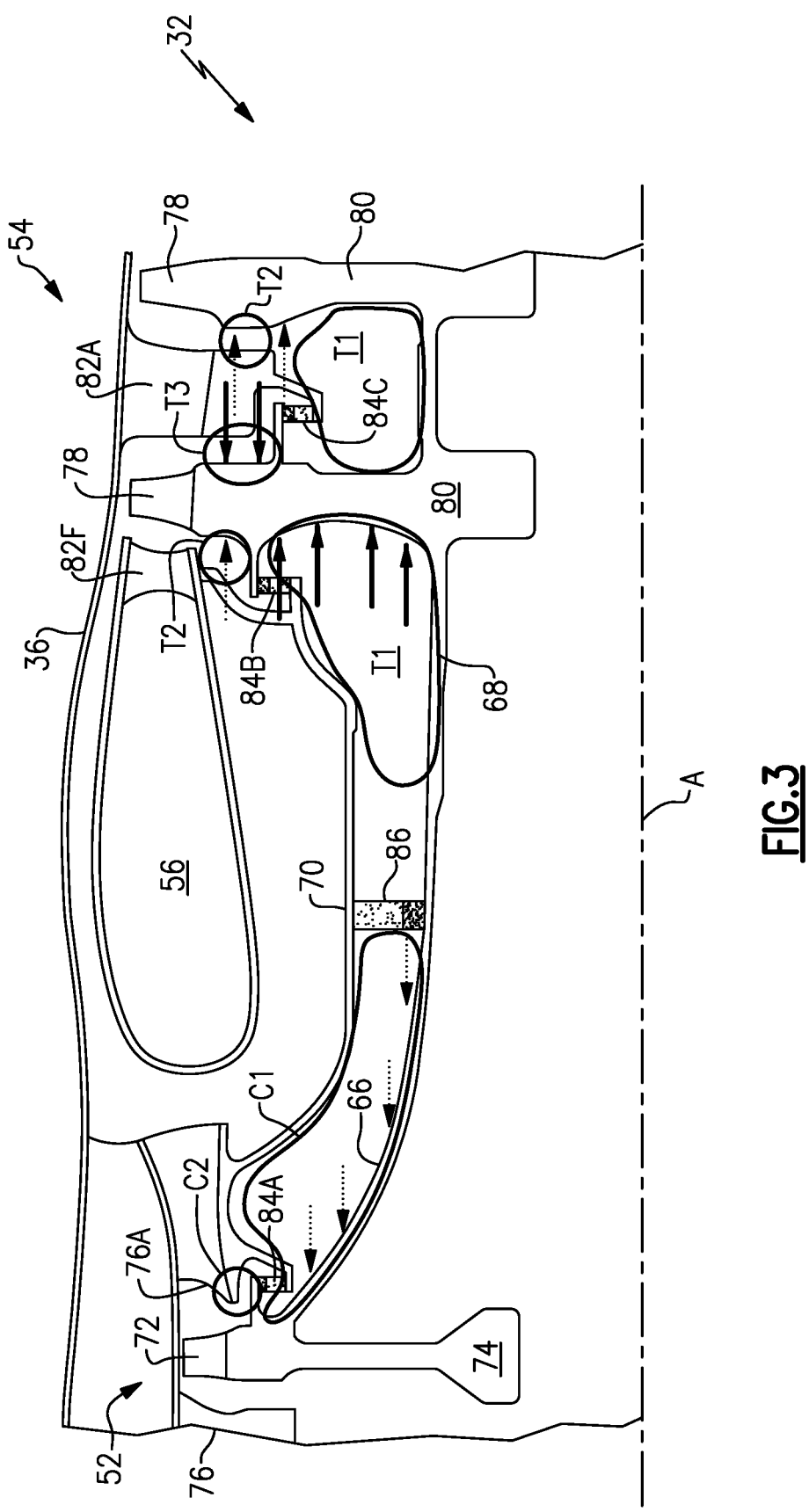
FIG. 3 is a schematic view of high pressure and low pressure areas on the high spool.

Referring to FIG. 3, the high pressure compressor 52 includes alternate rows of rotary airfoils or blades 72 mounted to disks 74 that alternate with vanes 76 supported within the core case 60. The high pressure turbine 54 includes alternate rows of rotary airfoils or blades 78 mounted to disks 80 that alternate with vanes 82F, 82A (two shown) also supported within the core case 60. In the disclosed, non-limiting embodiment, a multi-stage high pressure compressor 52 and a two stage high pressure turbine 54 are schematically illustrated; however, any number of stages will benefit herefrom.

The high spool 32 includes a multiple of rotor seals 84A, 86, 84B, 84C. The rotor seal 84A is located generally aft of the high pressure compressor 52 radially inward of an aft most compressor vane 76A. The rotor seal 86 is located between the high pressure compressor 52 and the high pressure turbine 54 generally between the outer shaft 50 and the inner diffuser case 70. The rotor seal 84B is located generally forward of the high pressure turbine 54 radially inward of the forward most turbine vane 82F while rotor seal 84C is located generally aft of a high pressure rotor 80 and radially inward of the aft most high turbine vane 82A.

The multiple of rotor seals 84A-84C and rotor seal 86 generally define secondary flow cavities C1, C3 (shown in FIG. 4), T1 and rim cavities C2, T2, T3 (illustrated schematically) of a secondary flow system within the gas turbine engine 20. The secondary flow cavities C1, C3, T1 receive a secondary flow that operates to cool rotational components, stationary components and also provide secondary functions and system operations within the engine 20. As defined herein, the secondary flow is any flow different than the relatively high temperature core flow which communicates through the combustor section 26.

Figure 4:
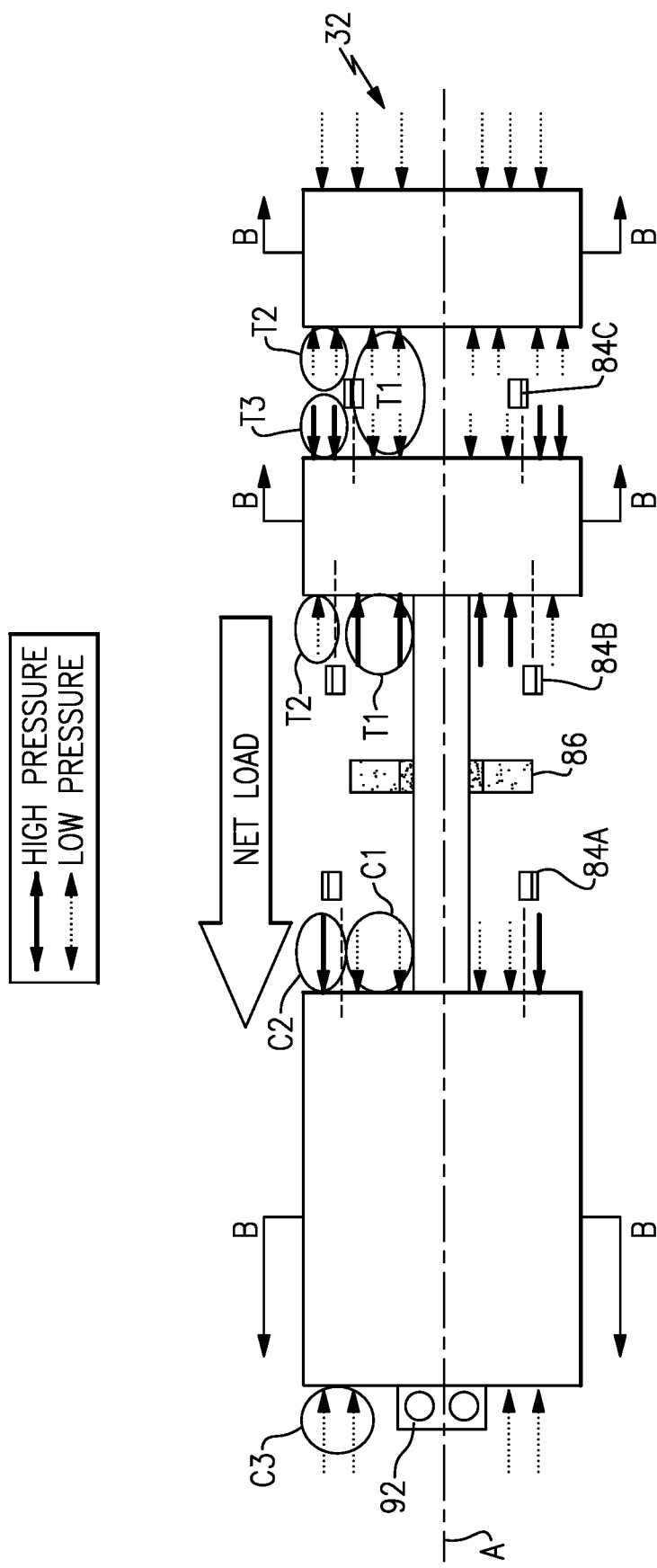
FIG. 4 is a schematic view of the loads on the high spool.

One of the technical challenges in turbine engine design is control of the thrust loads on a thrust bearing 92 of the high spool 32 (FIG. 4). The thrust bearing may be located forward and/or aft of the respective spool to react thrust forces generated thereby. The various aerodynamic loads B (illustrated schematically by high pressure and low pressure arrows) generated by the high pressure compressor 52 and the high pressure turbine 54 by their respective blades 72, 78 and the pressures within the secondary flow and rim cavities C1, C3, T1, C2, T2, T3 generate forces that are directed towards or away from the thrust bearing 92. The sum of these forces is the net thrust load. One aspect to configuration of the secondary flow system is control of the thrust load so that the thrust load is below the allowable load limit for the thrust bearing 92. A lower load on the thrust bearing 92 increases operational life.

In the disclosed, non-limiting embodiment, the net thrust load is forward. An increase in annulus area in the secondary flow cavities C1, C3, T1 facilitates aft loading to decrease the forward net thrust load. Conversely, a decrease in annulus area in cavities C2, T2, T3 facilitates aft loading to decrease the forward net thrust load. For the purposes of this disclosure, the term "annulus area" means the radially component of surfaces of the secondary flow cavities C1, C3, T1 and/or rim cavities C2, T2, T3.

The forward thrust load is readily lowered by location of the rotor seals 84A-84C in a radially outward position with respect to the engine central longitudinal axis A while radially locating the seal 86 radially inward with respect to the engine central longitudinal axis A. The rotor seals 84A-84C and rotor seal 86 facilitates maximization of the radial displacement between rotor seals 84A-84C and rotor seal 86. The maximization of the radial displacement thereby maximizes the annulus area in the secondary flow cavities C1, C3, T1 as compared to, for example, conventional knife edge seals. The relationship of non-contacting dynamic seals maximizes thrust balance potential and facilitates engine efficiency gains without a decrease in thrust bearing life.

Figures 5, 6:
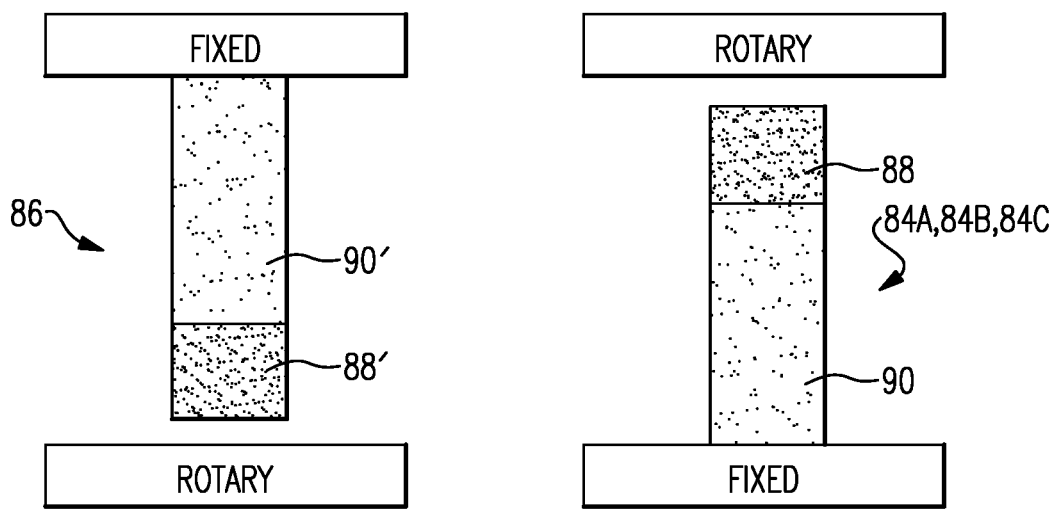
FIG. 5 is a schematic view of a rotary seal.
FIG. 6 is a schematic view of a RELATED ART rotary seal.

In one disclosed non-limiting embodiment, the rotor seals 84A-84C are non-contacting dynamic low leakage seals that seal adjacent to an outer diameter through hydrodynamic principles in which a static component seals against a rotating component. The rotor seals 84A-84C each include a floating shoe 88 which is radially outboard of a main body 90 (FIG. 5). The floating shoe 88 is operably designed such that as the rotating component such as rotor disk 74, 80 adjacent thereto rotates, a hydrodynamic film separates the floating shoe 88 from the rotating component. That is, the floating shoe 88 is the radially outermost component of the annular rotor seal seals 84A-84C. Such a configuration advantageously facilitates an annular size increase of the secondary flow cavities. In another embodiment, sealing is accomplished using hydrostatic principles where the floating shoes are separated from the rotating component by a balance of mechanical and pressure forces.

In the disclosed non-limiting embodiment, the rotor seal 86 is a conventional non-contacting dynamic seal with a floating shoe 88' radially inboard of the main body 90' (FIG. 6; RELATED ART) such as that manufactured by ATGI of Stuart, Fla. USA.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of controlling a net thrust load on a thrust bearing of a gas turbine engine spool comprising:

providing a spool defining a longitudinal axis and including a thrust bearing supporting a hub and a compressor mechanically coupled to a turbine by said hub;

establishing a first sealing relationship along the spool, including positioning a first non-contacting dynamic seal relative to the spool, the first non-contacting dynamic seal including a first body attached to a first floating shoe that seals with first rotatable inner surfaces of the spool to define a first flow cavity, and the first floating shoe radially inward of the first rotatable inner surfaces with respect to the longitudinal axis;

establishing a second sealing relationship along the spool, including positioning a second non-contacting dynamic seal relative to the spool, the second non-contacting dynamic seal including a second body attached to a second floating shoe that seals with second rotatable inner surfaces of the spool to define a second flow cavity, and the second floating shoe radially inward of the second rotatable inner surfaces with respect to the longitudinal axis; and establishing a third sealing relationship along the spool, including positioning a third non-contacting dynamic seal relative to the spool, the third non-contacting dynamic seal including a third body attached to a third floating shoe that seals with rotatable outer surfaces of the hub, the third non-contacting dynamic seal positioned axially between the first and second floating shoes relative to the longitudinal axis to define the first flow cavity and the second flow cavity, and the third floating shoe radially outward of the rotatable outer surfaces with respect to the longitudinal axis.

2. The method as recited in claim 1, wherein each of the first non-contacting dynamic seal, the second non-contacting dynamic seal and the third non-contacting dynamic seal is a hydrostatic seal.

3. The method as recited in claim 2, wherein each of the first, second and third floating shoes is moveable in a radial direction with respect to the longitudinal axis in response to rotating at least one of the first rotatable inner surfaces, the second rotatable inner surfaces and the outer rotatable surfaces.

4. The method as recited in claim 2, wherein the compressor is a high pressure compressor, and each of the second non-contacting dynamic seal and the third non-contacting dynamic seal is positioned aft of the high pressure compressor with respect to the longitudinal axis.

5. The method as recited in claim 4, wherein the first non-contacting dynamic seal is positioned radially inboard of a high pressure compressor vane of the turbine with respect to the longitudinal axis, and the first rotatable inner surfaces are located along a platform of a compressor blade of the compressor.

6. The method as recited in claim 5, wherein the third non-contacting dynamic seal is positioned between an outer shaft of the spool and an inner diffuser case of a combustor.

7. The method as recited in claim 4, wherein each of the first non-contacting dynamic seal, the second non-contacting dynamic seal and the third non-contacting dynamic seal is positioned axially forward of the turbine with respect to the longitudinal axis, and the turbine is a high pressure turbine axially forward of a second turbine with respect to the longitudinal axis.

8. The method as recited in claim 6, wherein the third non-contacting dynamic seal is positioned between an outer shaft of the spool and an inner diffuser case of a combustor.

9. The method as recited in claim 2, wherein the spool is a high spool coaxial with a low spool including a low pressure compressor and a low pressure turbine.

10. The method as recited in claim 9, wherein the low spool drives a fan through a geared architecture.

11. The method as recited in claim 2, wherein each of the first and second non-contacting dynamic seals is positioned radially outward of the third non-contacting dynamic seal with respect to the longitudinal axis.

12. The method as recited in claim 11, wherein each of the first, second and third floating shoes is moveable in a radial direction with respect to the longitudinal axis in response to rotating at least one of the first rotatable inner surfaces, the second rotatable inner surfaces and the outer rotatable surfaces.

13. The method as recited in claim 12, wherein the first flow cavity and the second flow cavity are dimensioned in the radial direction such that net thrust loads exerted on the thrust bearing are reduced.

14. The method as recited in claim 12, wherein the first flow cavity and the second flow cavity are positioned axially between the compressor and the turbine with respect to the longitudinal axis.

15. The method as recited in claim 2, wherein each of the first body, the second body, and the third body is fixedly attached to and extends from a static structure of the spool.

16. The method as recited in claim 15, wherein the third non-contacting dynamic seal is positioned radially between an outer shaft of the spool and an inner diffuser case of a combustor with respect to the longitudinal axis, the third body of the third non-contacting dynamic seal extends from and is fixedly attached to the inner diffuser case, and the rotatable outer surfaces are located along the outer shaft.

17. The method as recited in claim 16, wherein the first flow cavity and the second flow cavity are positioned axially between the compressor and the turbine with respect to the longitudinal axis.

18. The method as recited in claim 16, wherein the second non-contacting dynamic seal is positioned radially inboard of a high pressure turbine vane of the turbine with respect to the longitudinal axis, and the second rotatable inner surfaces are located along a platform of a turbine blade of the turbine.

19. The method as recited in claim 16, wherein the second non-contacting dynamic seal is positioned axially aft of a high pressure turbine rotor of the turbine with respect to the longitudinal axis.

20. The method as recited in claim 16, wherein the second non-contacting dynamic seal is positioned radially inboard of a high pressure turbine vane of the turbine with respect to the longitudinal axis, the second rotatable inner surfaces are located along a platform of the high pressure turbine vane, and the first non-contacting dynamic seal is positioned axially forward of the turbine with respect to the longitudinal axis.

* * * * *